United States Patent [19]
Yamada

[11] Patent Number: 5,661,580
[45] Date of Patent: Aug. 26, 1997

[54] SCM TYPE OF OPTICAL SIGNAL TRANSMISSION SYSTEM WITHOUT CLIPPING DISTORTION

[75] Inventor: Hirohito Yamada, Tokyo, Japan

[73] Assignee: NEC Corporation, Tokyo, Japan

[21] Appl. No.: 504,501

[22] Filed: Jul. 20, 1995

[30] Foreign Application Priority Data

Jul. 28, 1994 [JP] Japan .................................. 6-176391

[51] Int. Cl.⁶ .................................................. H04J 14/02
[52] U.S. Cl. ............................................ 359/126; 359/132
[58] Field of Search ................................... 359/123, 173, 359/125, 124, 126, 132

[56] References Cited

U.S. PATENT DOCUMENTS

| | | | |
|---|---|---|---|
| 4,506,356 | 3/1985 | Krull | 359/123 |
| 4,545,048 | 10/1985 | Hauk et al. | 359/123 |
| 5,020,049 | 5/1991 | Bodeep et al. | 359/124 |
| 5,046,139 | 9/1991 | Kahn | 359/124 |
| 5,107,360 | 4/1992 | Huber | 359/124 |
| 5,189,673 | 2/1993 | Burton et al. | 359/125 |
| 5,303,229 | 4/1994 | Wither et al. | 370/58.1 |
| 5,379,141 | 1/1995 | Thompson et al. | 359/132 |

OTHER PUBLICATIONS

Fiber Optic Analog—Digital Hybrid Signal Transmission Employing frequency Modulation, 1985, IEEE, pp. 433–441, Ken-ichi sato.

A Hybrid Lightwave Transmission System for Subcarrier Multiplexed Video and Digital B–ISDN Services in the Local Loop, Charles N. Lo, 1989 IEEE 1839–1848.

A Migration Path to BISD, Olshansky, 1990 IEEE pp. 30–31.

Robert Olshansky et al., "Subcarrier Multiplexed Lightwave Systems for Broadband Distribution," Journal of Lightwave Technology, vol. 7, No. 9, pp. 1329–1341, Sep. 1989.

Winston I. Way, "Subcarrier Multiplexed Lightwave System Design Considerations for Subscriber Loop Applications", Journal of Lightwave Technology, vol. 7, No. 11, pp. 1806–1818, Nov. 1989. 1994 Spring Conference of IEICE (1128).

Primary Examiner—Wellington Chin
Assistant Examiner—Rafael Bacares
Attorney, Agent, or Firm—Foley & Lardner

[57] ABSTRACT

A subcarrier multiplexed type of optical signal transmission system includes a transmitting unit, a receiving unit, and a single optical fiber. The transmitting unit includes a plurality of multiplexing circuits, each of which frequency-division-multiplex of analog image signals to produce an electric signal; a plurality of modulating units provided for the remaining multiplexing circuits, wherein each of the plurality of second modulating units performs analog-modulation of an optical oscillation signal in accordance with the electric signal without clipping to produce an optical signal; and a coupling unit for combining the optical signals to produce a transmission optical signal which is to be transmitted onto a single optical fiber. In this case, a distributed feedback type semiconductor laser is preferable as each of the plurality of modulating units. Further, each of the plurality of modulating units is preferably provided with an optical isolator at the output side for preventing a reflected optical signal from being inputted. In order to prevent any clipping distortion, it is preferable that an optical modulation is small for each of the plurality of modulating units, e.g., semiconductor lasers and an effective analog-modulation index of the optical oscillation signal in each of the remaining modulating units is equal to or less than 20%.

18 Claims, 4 Drawing Sheets

SCM TYPE OF OPTICAL SIGNAL TRANSMISSION SYSTEM WITHOUT CLIPPING DISTORTION

BACKGROUND OF THE INVENTION

1. Field of the Invention

The present invention relates to an optical signal transmission system, and more particularly, to an optical signal transmission system in analog data service such as a bidirectional cable television (CATV) in which high carrier to noise ratio (CNR) characteristic is requested.

2. Description of the Related Art

In the next generation CATV systems discussed recently from various viewpoints, a digital video signal needs to be transmitted for broad band bidirectional communication services by video on demand (VOD) signals from subscribers services, as well as conventional broadcasting image signals (vestigial sideband—analog modulation (VSB-AM) signals). Further, it is importance to implement such a transmission system with low cost.

As a transmission system which satisfy the needs, there is a subcarrier multiplexed (SCM) system which is described by Robert Olshansky et al. in "Subcarrier Multiplexed Lightwave Systems for Broad-Band Distribution", (Journal of Lightwave Technology, Vol. 7, No. 9, September 1989, pp. 1329–1341) as reference 1 and by Winston I. Way in "Subcarrier Multiplexed Lightwave System Design Considerations For Subscriber Loop applications", (Journal of Lightwave Technology, Vol. 7, No. 11, November 1989, pp. 1806–1818) as reference 2.

This SCM system is an optical signal transmission system using a single mode optical fiber as a transmission medium. Base band analog or digital signals for a plurality of channels, e.g., 60 channels are first high-frequency converted or up-converted using local oscillation circuits (LOs) having different frequencies and then frequency-division-multiplexed. These up-converted signals are synthesized or combined and a laser unit is modulated in accordance with the synthesized high-frequency signal or a combined signal. The frequency of an oscillation signal from the local oscillation circuit is a subcarrier for an optical carrier frequency. In the receiving unit, one of the frequency-division-multiplexing (FDM) channels is selected by a subscriber through a tuning operation of a local oscillation circuit, like the usual tuning operation in a television receiver and radio. A high frequency/microwave signal of the selected FDM channel is low-frequency-converted or down-converted to restore an original base band analog or digital signal.

In the above SCM system, in a case where analog image signal for 60 channels and a VOD signal as a digital video signal are simultaneously transmitted, there is a problem in that noise is generated due to clipping distortion so that a bit error rate of the VOD signal is increased because an effective optical modulation exceeds 20% for the image signals for 60 channels.

In order to solve the problem, an optical SCM transmission system is proposed in the proceedings of the 1994 spring Conference of IEICE (B-1128) (reference 3). In the reference 3, there is discussed an optimal method in which the bit error rate due to the clipping distortion can be reduced in the transmission of the combined signal composed of a VSB-AM signal as analog image signals and multivalue digital carrier signal (16QAM) as the digital video signal (to be referred to as a VOD signal) and it is concluded that it is effective to separate an image signal transmission system and a VOD signal transmission system from each other such that the VSB-AM signal and the 16QAM signal are transmitted in parallel.

FIG. 1 is a block diagram showing a conventional optical signal transmission system described in the reference 3. Referring to FIG. 1, the conventional optical signal transmission system includes an optical signal transmitting unit 101 for outputting an optical signal LF60 corresponding to image signals 60VA for 60 channels and an optical signal LV corresponding to a VOD signal VD independently, optical fibers 102 and 104 for transferring the optical signals LF60 and LV, respectively, and an optical signal receiving unit 103 for receiving the optical signals LF60 and LV and detecting a reception combined signal.

The optical signal transmitting unit 101 includes frequency division multiplexing (FDM) circuits 111 for frequency-division-multiplexing the image signals 60VA for 60 channels to produce an FDM signal F60, a semiconductor laser (LD) 112 which is subjected to analog-modulation based on the FDM signal F60 and outputs an optical signal LF60 on the optical fiber 102 via an optical isolator 113, the optical isolator 113 for preventing reflected light of the optical signal LF60 from being inputted into the semiconductor laser 112, an FDM circuit 114 for frequency-division-multiplexing the VOD signal VD to produce an FDM signal FV, and a semiconductor laser (LD) 115 which is subjected to analog-modulation based on the FDM signal FV and outputs an optical signal LV on the optical fiber 104. The receiving unit 103 includes an optical signal detector (PD) 121 coupled to the optical fiber 102, for receiving and photoelectrically converting the optical signal LF60 into a reception signal R60 and an optical signal detector (PD) 122 coupled to the optical fiber 104, for receiving and photoelectrically converting the optical signal LV into a reception signal RV.

Next, the operation of the conventional optical signal transmission system will be described with reference to FIGS. 2A and 2B which indicate the examples of analog-modulation of a semiconductor laser (LD). As shown in FIG. 2A, the analog-modulation of the semiconductor laser is a so-called small amplitude modulating operation in which the semiconductor laser is supplied with a current which satisfies the oscillation condition of the semiconductor laser, i.e., a constant bias current higher than a threshold current and a modulation current is superposed on the bias current. If the amplitude of the modulation current becomes greater so that the negative peak of the modulation current is decreased lower than the threshold current as shown in FIG. 2B, a part of the modulated light output signal, the negative peak in the example is cut so that the clipping distortion is caused. Also, when the output of the semiconductor laser is saturated at the positive peak, the clipping distortion is caused. Thus, the clipping distortion is caused when the optical modulation of the semiconductor laser is more than 100%.

In this conventional optical signal transmission system, since an FDM signal F60 corresponding to the image signals for 60 channels needs to be transmitted, the optical signal outputted from the single semiconductor laser 112 is modulated in accordance with the FDM signal F60. In this case, an effective optical modulation μe is represented by the following equation for the FDM signal F60.

$$\mu_e = \left\{ \sum_{i=1}^{N} (1/2) \mu_i^2 \right\}^{1/2}$$

where N is the number of image signals which constitute the FDM signal F60 and μi is the optical modulation index for the image signal VAi, A relation between the effective modulation index μe and the clipping distortion is experimentally obtained. For instance, when an optical modulation index is 5% for an image signal for one channel and image signals for 60 channels are supplied to the semiconductor laser 112 as the FDM signal F60, the effective optical modulation index μe of the semiconductor laser 112 is about 27%.

FIG. 3 is a graph showing a relation of a bit error rate (BER) to a carrier to noise ratio (CNR) when image signals of a plurality of channels and a VOD signal of one channel are simultaneously transmitted through modulation by a single semiconductor laser. It can be seen that a bit error is abruptly increased if the effective optical modulation index exceeds 20%. This is because the impulse noise due to the clipping distortion adversely influences to the modulated signal.

SUMMARY OF THE INVENTION

Therefore, the present invention has, as an object, to provide an optical signal transmission system in which image signals can be transmitted without any clipping distortion and a transmitting method for the transmission system.

Another object of the present invention is to provide an optical signal transmission system in which image signals can be transmitted without adverse influence of beat noise and a transmitting method for the transmission system.

In order to achieve an aspect of the present invention, a subcarrier multiplexed type of optical signal transmission system includes a transmitting unit, a receiving unit, and a single optical fiber. The transmitting unit includes a plurality of multiplexing circuits, each of which frequency-division-multiplex of analog image signals to produce an electric signal; a plurality of modulating units provided for the remaining multiplexing circuits, wherein each of the plurality of second modulating units performs analog-modulation of an optical oscillation signal in accordance with the electric signal without clipping to produce an optical signal; and a coupling unit for combining the optical signals to produce a transmission optical signal which is to be transmitted onto a single optical fiber. In this case, a distributed feedback type semiconductor laser is preferable as each of the plurality of modulating units. Further, each of the plurality of modulating units is preferably provided with an optical isolator at the output side for preventing a reflected optical signal from being inputted.

A CATV system to which the subcarrier multiplexed type of optical signal transmission system is applied, may further includes an additional multiplexing circuits for frequency-division-multiplexing digital image signals for video on demand (VOD) to produce an additional electric signal; and an additional modulating unit provided for the additional multiplexing circuit, for performing analog-modulation of an optical oscillation signal in accordance with the additional electric signal to produce an additional optical signal. In the case, the coupling unit combines the optical signals and the additional optical signal to produce the transmission optical signal.

In order to prevent any clipping distortion, it is preferable that an optical modulation index is small for each of the plurality of modulating units, e.g., semiconductor lasers and an effective analog-modulation of the optical oscillation signal in each of the remaining modulating units is equal to or less than 20%.

It is preferable that the plurality of modulating units respectively include 1.3 μm wavelength semiconductor lasers in which wavelengths of the optical oscillation signals are different from one after another by at least 0.1 nm, because any beat noise can be avoided when the transmission band of the optical channel signals is in a range of about 50 MHz to 1 GHz.

In order to achieve another aspect of the present invention, a method of transmitting image signals using a single optical fiber comprising the steps of:

frequency-division-multiplexing sets of analog image signals into electric signals, respectively;

analog-modulating of optical oscillation signals into optical signals in accordance with the electric signals, respectively; and synthesizing the optical signals into a transmission optical signal which is to be transmitted onto the single optical fiber.

The method may further includes frequency-division-multiplexing digital image signals into an additional electric signal; and analog-modulating of an optical oscillation signal into an additional optical signal in accordance with the additional electric signal such that any clipping distortion does not occur. In this case, the optical signals and the additional optical signal are synthesized into the transmission optical signal. Further, an effective analog-modulation in the analog-modulating in accordance with the electric signals is preferably equal to or less than 20%. Further, the analog-modulating into the optical signals is preferably performed such that a difference in frequency between any two of the optical oscillation signals falls out of transmission bands of the analog image signals.

DESCRIPTION OF THE PREFERRED EMBODIMENTS

The optical signal transmission system according to the present invention will be described below in detail with reference to the accompanying drawings.

First, the structure of the optical signal transmission system according to an embodiment of the present invention will be described with reference to FIG. 4.

Figure 1:
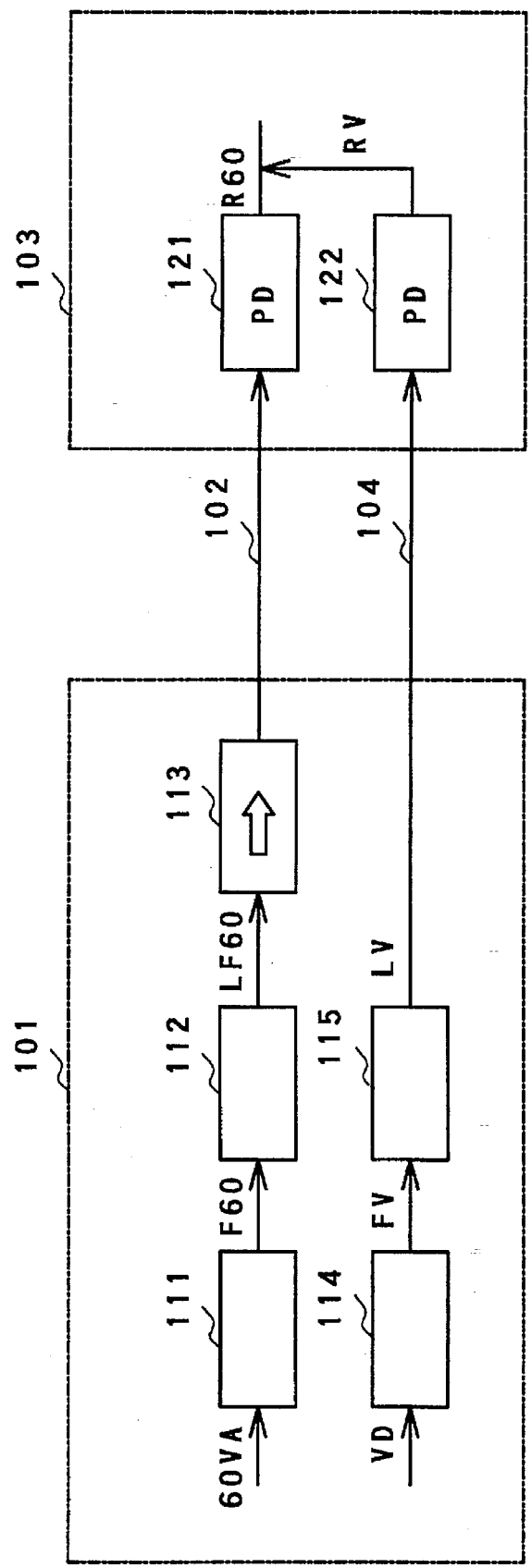
FIG. 1 is a block diagram showing a conventional subcarrier multiplexed type of optical signal transmission system.
Figure 2A:
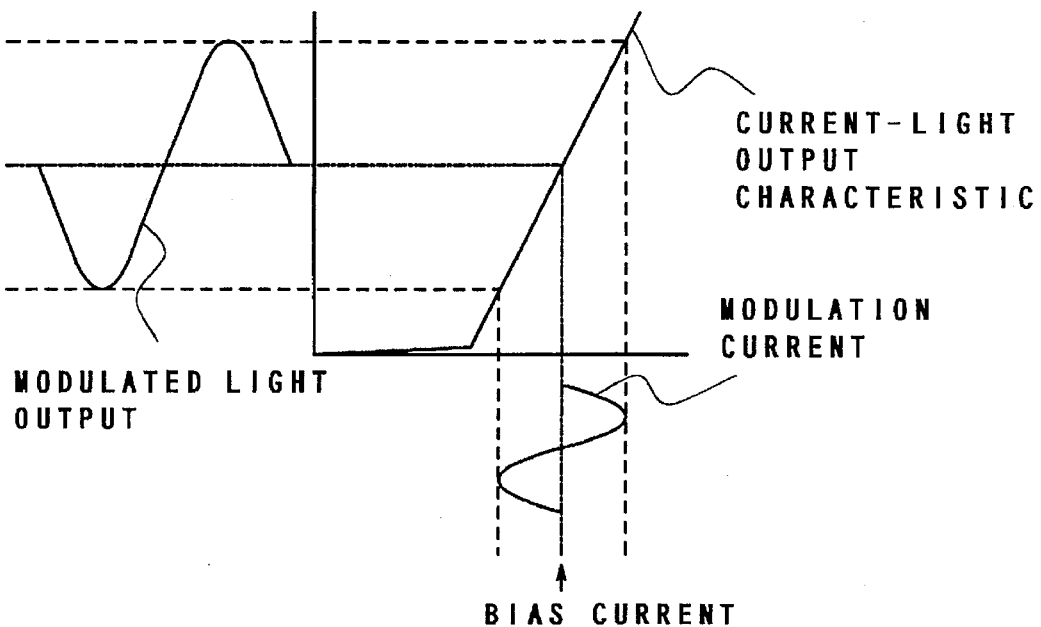
FIGS. 2A and 2B are diagrams showing occurrence of clipping distortion in a semiconductor laser.
Figure 2B:
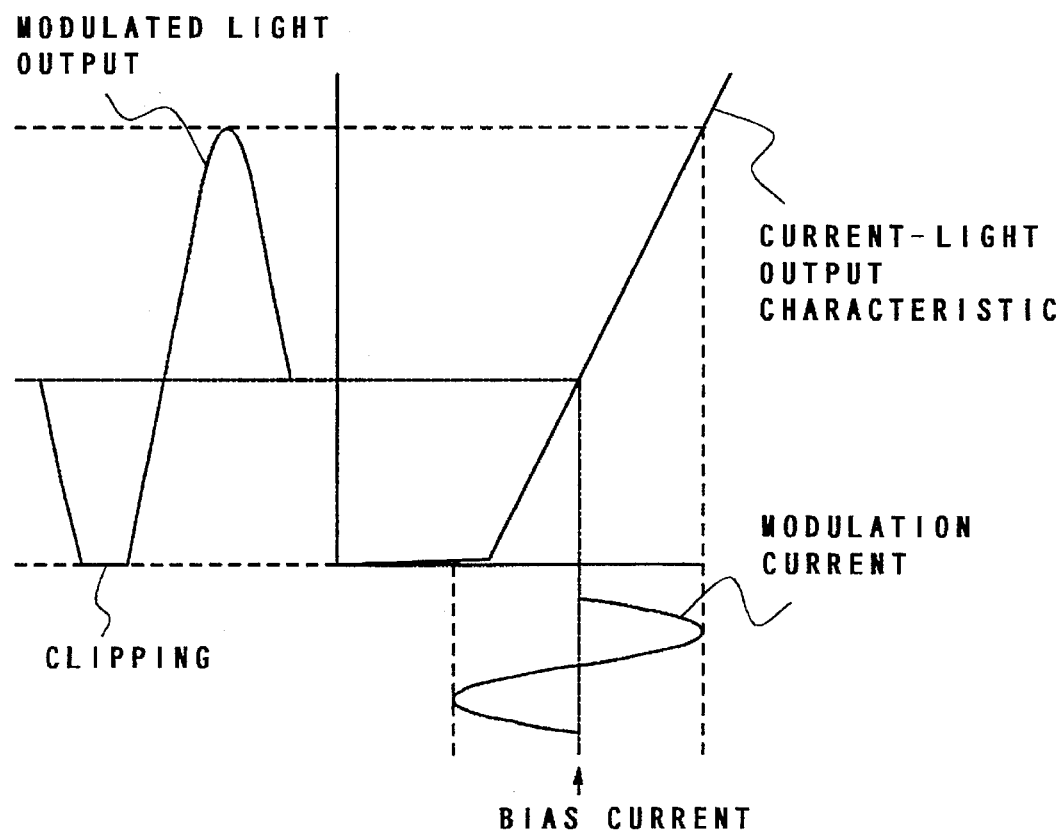
Figure 3:
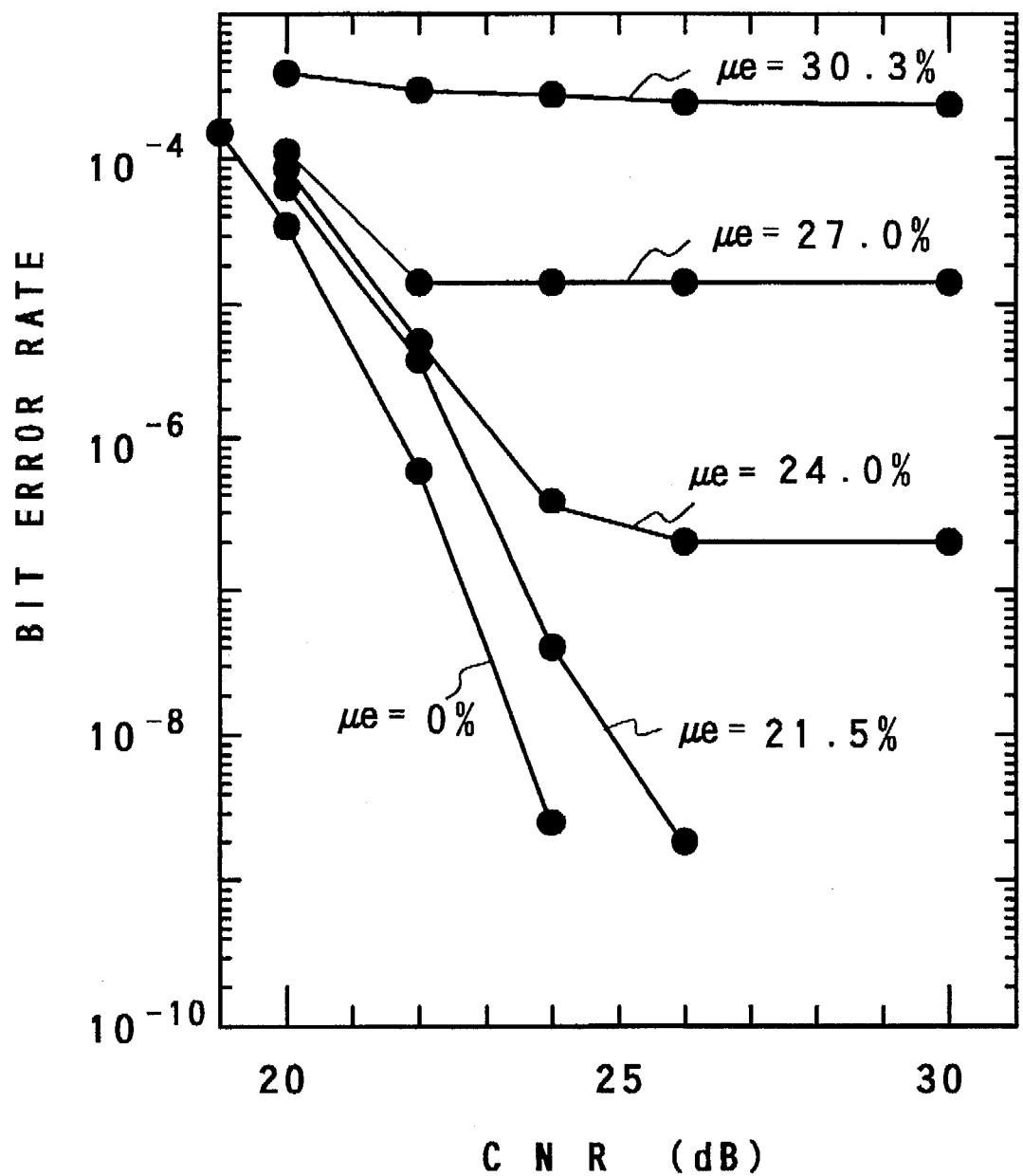
FIG. 3 is a graph showing a relation of a bit error rate (BER) and a carrier to noise ratio (CNR)
Figure 4:
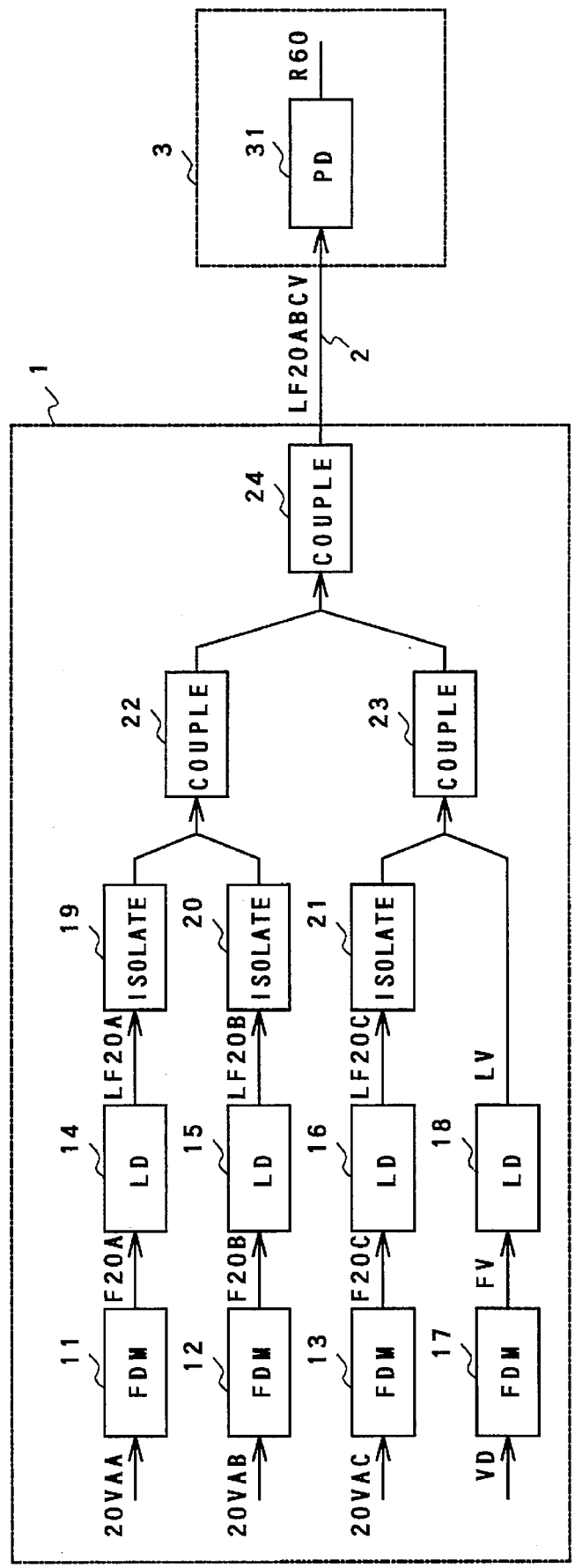
FIG. 4 is a block diagram showing a subcarrier multiplexed type of optical signal transmission system according to an embodiment of the present invention.

In FIG. 4, the optical signal transmission system includes an optical signal transmitting unit 1, an optical fiber 2, and an optical signal receiving unit 3. The optical signal transmitting unit 1 combines optical signals LF20A, LF20B and LF20C for three channels each of which corresponds to image signals 20VAA, 20VAB or 20VAC for 20 channels, and an optical signal LV corresponding to a VOD signal VD to produce a combination optical signal LF20ABCV and transmits the combination optical signal LF20ABCV onto the optical fiber 2. The optical signal receiving unit 3 receives the combination optical signal LF20ABCV to produce a reception combination signal R60.

The optical signal transmitting unit 1 includes frequency divisional multiplexing (FDM) circuits 11, 12 and 13, semiconductor lasers (LDs) 14, 15 and 16, an FDM circuit 17, a semiconductor laser (LD) 18, an optical isolator 19, 20 and 21, and optical couplers 22, 23 and 24. The FDM circuits 11, 12 and 13 frequency-divisional-multiplex image signals 20VAA, 20VAB and 20VAC for 20 channels to produce FDM signals F20A, F20B and F20C, respectively. The semiconductor lasers (LDs) 14, 15 and 16 output optical signals LF20A, LF20B and LF20C from the FDM signals F20A, F20B and F20C, respectively. The FDM circuit 17 frequency-divisional-multiplexes a VOD signal VD to produce an FDM signal FV. The semiconductor laser (LD) 18 outputs an optical signal LV from the FDM signal FV. The optical isolators 19, 20 and 21 are provided at the output side of the semiconductor lasers (LDs) 14, 15 and 16 to prevent an optical signal reflected by a load side from being inputted, respectively. The optical coupler 22 of 3 dB combines the optical signals LF20A and LF20B outputted from the semiconductor lasers 15 and 16 to produce an optical signal LF20AB and the optical coupler 23 combines the optical signals LF20C and LV outputted from the semiconductor lasers 16 and 18 to produce an optical signal LF20V. The optical coupler 24 combines the optical signal LF20AB and the optical signal LF20V to produce the optical signal LF20ABCV for transmission of it to the optical signal receiving unit 3 via the optical fiber 2. The receiving unit 3 includes an optical signal detector (PD) 31 for receiving the optical signal LF20ABCV and performs photoelectric conversion to the received optical signal to produce a reception signal R60.

Next, the operation of the optical signal transmission system according to the embodiment of the present invention will be described below. In this embodiment, assume that image signals for 60 channels and VOD signals for 260 channels for requests from subscribers are transmitted via a single optical fiber in the optical signal transmission system for a CATV system. As described in the related art, in a case where these signals is transmitted using a single semiconductor laser, if an optical signal modulation index of the image signal is 5% per a channel, an effective optical signal modulation is about 27% for the image signals of 60 channels. As a result, clipping distortion occurs. If the optical signal modulation is decreased in order to prevent the occurrence of clipping distortion, the effective optical signal modulation can be decreased for 60 channels. In this method, however, there is a problem that a carrier to noise ratio (CNR) is reduced.

In order to remove the influence by the clipping distortion and to keep a high CNR, a plurality of semiconductor lasers are provided to restrict the effective optical signal modulation index to 20% or below in the embodiment. If the optical signal modulation index of the image signal is 5% per a channel, like the conventional technique, the effective optical signal modulation index µe can be suppressed to 20% or below when up to 32 channels are frequency-divisional-multiplexed by a single semiconductor laser. Therefore, it is preferable that at least two semiconductor lasers are used in a case of transmission of 60 channels of image signals and at least three semiconductor laser are used in a case of transmission of 80 channels of image signals.

In this embodiment, the three semiconductor lasers 14, 15 and 16 are provided for the image signals for 60 channels, that is, the analog-modulation is performed for the FDM signals F20A, F20B and F20C corresponding to the image signals for 20 channels 20VAA, 20VAB and 20VAC by the semiconductor lasers 14, 15 and 16, respectively. In this case, if the optical modulation index is 6.3% or below for one channel, the effective optical modulation index µe is equal to or less than 20% from the above equation, resulting in no clipping distortion. On the other hand, the VOD signal is transmitted through the same optical fiber 2 using the semiconductor laser 18. The optical signals outputted from the semiconductor lasers 14 to 18 are synthesized or combined by the 3-dB optical coupler 22 to 24 to a single optical signal LF20ABCV which is transmitted through the single optical fiber 2. In this case, a single optical fiber having 4 inputs and 1 output may be used, if available.

The semiconductor laser 14 to 16 need to have a specifically small intermodulation distortion for analog modulation of the FDM signals corresponding to analog image signals. In the embodiment, a semiconductor laser of a distributed feedback (DFB) type is used which is manufactured for the CATV system and has a distortion characteristic as low as a composite second order distortion (CSO) of −60 dB and a composite triple beat (CTB) less than −70 dB. On the other hand, a DFB type of semiconductor laser having a usual distortion characteristic is sufficient for the semiconductor laser 17 by which the FDM signal FV corresponding to the VOD signal is modulated.

In a case that the optical signals outputted from the semiconductor lasers are synthesized by the optical couplers as in the embodiment, beat noise is generated corresponding to the difference in frequency between any two of the lasing wavelengths of the semiconductor lasers. Therefore, the frequencies of the beat noise need to be set outside of the transmission band for the signals, i.e., the FDM signals F20A, F20B, F20C and FV. The laser oscillation frequency or wavelength of each of the semiconductor lasers is set such that the beat noise frequency is sufficiently higher or lower than the transmission band. In the SCM type of CATV system, the transmission band is in a range of about 50 MHz to 1 GHz. In a case of 1.3 µm wavelength semiconductor laser, if the difference in wavelength between two laser oscillations is less than 0.00028 nm or more than 0.0057 nm, the above condition can be satisfied. Therefore, the semiconductor laser is sufficient to have the wavelength difference of about 0.1 nm between the laser oscillations. In this embodiment, 1.3 µm wavelength semiconductor lasers having the wavelength difference of laser oscillation of 0.1 nm or above are used as the semiconductor lasers 14–16 to 18.

As described above, in the optical signal transmission system according to the present invention, since image signals for a plurality of channels are allocated to the semiconductor lasers each of which performs analog-modulation for the allocated image signals, the effective optical modulation of each semiconductor laser is sufficiently lower than a level at which clipping distortion is caused. Therefore, the frequency-division-multiplexed signals for the image signals and the digital video signal for the video on demand can be transmitted without occurrence of any clipping distortion.

What is claimed is:

1. A subcarrier multiplexed type of optical signal transmission system comprising:

a transmitting unit, which comprises:
a plurality of multiplexing circuits, wherein at least one of said plurality of multiplexing circuits frequency-division-multiplexes image signals to produce a first electric signal and each of the remaining multiplexing circuits frequency-division-multiplex image signals to produce a second electric signal,
a first modulating unit provided for said at least one multiplexing circuit, each of which performs modulation of an optical signal in accordance with said first electric signal to produce a first optical signal, a plurality of second modulating units provided for said remaining multiplexing circuits, wherein each of said plurality of second modulating units performs modulation of an optical signal in accordance with a corresponding one of said second electric signals to produce a second optical signal, and a coupling unit for coupling said first and second optical signals to produce a transmission optical signal;

a single mode optical fiber; and a receiving unit for receiving the transmission optical signal from said transmitting unit via said optical fiber to perform photoelectric conversion of the received signal to produce a reception electric signal and detecting a frequency-division-multiplexed analog image signal from the reception electric signal; wherein an effective modulation index of said optical signal in each of said second modulating units is equal to or less than 20%.

2. The subcarrier multiplexed type of optical signal transmission system according to claim 1, wherein each of said remaining modulating units is provided with an optical isolator at the output side for preventing a reflected optical signal from being inputted.

3. The subcarrier multiplexed type of optical signal transmission system according to claim 1, wherein each of said remaining modulating units includes a distributed feedback type of semiconductor laser.

4. The subcarrier multiplexed type of optical signal transmission system according to claim 1, wherein said plurality of modulating units respectively include 1.3 μm wavelength semiconductor lasers in which lasing wavelengths of said lasers are different from one after another by at least 0.1 nm.

5. An optical signal transmitting unit comprising:

a plurality of multiplexing circuits, each of which frequency-division-multiplexes first electric signals to produce a second electric signal;

a plurality of modulating units, wherein each of said plurality of modulating units performs modulation of an optical oscillation signal in accordance with said second electric signal to produce an optical signal; and a coupling unit for combining said optical signals to produce a transmission optical signal which is to be transmitted onto a single optical fiber wherein an effective modulation index of said optical signal in each of said plurality of modulating units is equal to or less than 20%.

6. The optical signal transmitting unit according to claim 5, further comprising:

an additional multiplexing circuits for frequency-division-multiplexing digital image signals to produce an additional electric signal; and an additional modulating unit provided for said additional multiplexing circuit, for performing analog-modulation of an optical signal in accordance with said additional electric signal to produce an additional optical signal, and wherein said coupling unit combines said optical signals and said additional optical signal to produce the transmission optical signal.

7. The optical signal transmitting unit according to claim 5, wherein each of said plurality of modulating units is provided with an optical isolator at the output side for preventing a reflected optical signal from being inputted.

8. The optical signal transmitting unit according to claim 5, wherein each of said plurality of modulating units includes a semiconductor laser of a distributed feedback type.

9. The optical signal transmitting unit according to claim 5, wherein said plurality of modulating units respectively include 1.3 μm wavelength semiconductor lasers in which lasing wavelengths of said lasers are different from one after another by at least 0.1 nm.

10. A method of transmitting image signals using a single optical fiber comprising the steps of:

frequency-division-multiplexing sets of image signals into electric signals, respectively;

analog-modulating of optical oscillation signals into optical signals in accordance with said electric signals, respectively; and synthesizing said optical signals into a transmission optical signal which is to be transmitted in said single optical fiber, wherein said analog-modulating step includes analog-modulating with an effective modulation index equal to or less than 20% in accordance with said electric signals.

11. The method according to claim 10, further comprising:

frequency-division-multiplexing digital image signals into an additional electric signal; and analog-modulating of an optical signal into an additional optical signal in accordance with said additional electric signal such that any clipping distortion does not occur, and wherein said synthesizing step includes synthesizing said optical signals and said additional optical signal into the transmission optical signal.

12. The method according to claim 9, wherein said analog-modulating step includes analog-modulating into said optical signals such that a difference in lasing frequency between any two of said lasers falls out of transmission bands of said analog image signals.

13. An optical signal transmitting unit comprising:

a plurality of multiplexing circuits, each of which frequency-division-multiplexes image signals to produce an electric signal;

a plurality of modulating units provided for said remaining multiplexing circuits, wherein each of said plurality of modulating units performs modulation of an optical oscillation signal from a laser in accordance with said electric signal to produce an optical signal, and wherein a difference in lasing frequency between any two of said lasers falls out of transmission bands of said image signals; and a coupling unit for combining said optical signals to produce a transmission optical signal which is to be transmitted onto a single optical fiber, wherein an effective modulation index of said optical oscillation signal in each of said plurality of modulating units is equal to or less than 20%.

14. The optical signal transmitting unit according to claim 13, further comprising:

an additional multiplexing circuits for frequency-division-multiplexing digital image signals to produce an additional electric signal; and an additional modulating unit provided for said additional multiplexing circuit, for performing analog-modulation of an optical signal in accordance with said additional electric signal to produce an additional optical signal, and wherein said coupling unit combines said optical signals and said additional optical signal to produce the transmission optical signal.

15. The optical signal transmitting unit according to claim 13, wherein each of said plurality of modulating units includes a semiconductor laser of a distributed feedback type having a composite second order distortion (CSO) of −60 dB or below and a composite triple beat (CTB) of −70 dB or below.

16. The optical signal transmitting unit according to claim 13, wherein said plurality of modulating units respectively include 1.3 μm band semiconductor lasers in which lasing wavelengths of said lasers are different from one after another by at least 0.1 nm.

17. An optical signal transmission system for transmitting analog and digital signals simultaneously over optical fiber comprising:

an optical signal transmitting unit, further comprising:
a plurality of frequency-division-multiplexing circuits for multiplexing a plurality of first electric signals to obtain a plurality of second electric signals;
a plurality of modulating units for modulating said plurality of second electric signals to obtain a corresponding plurality of optical signals; and
a synthesizer for combining said plurality of optical signals into a transmission optical signal;

an optical fiber; and an optical signal receiving unit for receiving said transmission optical signal through said optical fiber from said optical transmitting unit, wherein an effective optical modulation index of each of said plurality of modulating units is less than or equal to 20%.

18. An optical signal transmission system for transmitting analog and digital signals simultaneously over optical fiber according to claim 14, wherein said synthesizer comprises one of an optical coupler and a plurality of optical couplers.

* * * * *